United States Patent
Kaidu et al.

(10) Patent No.: US 9,543,866 B2
(45) Date of Patent: Jan. 10, 2017

(54) MOTOR DRIVE CONTROLLER AND METHOD FOR DETECTING ROTATION STATE

(71) Applicant: MINEBEA CO., LTD., Kitasaku-Gun, Nagano (JP)

(72) Inventors: Hiroyuki Kaidu, Iwata (JP); Masato Aoki, Iwata (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 14/952,170

(22) Filed: Nov. 25, 2015

(65) Prior Publication Data

US 2016/0156295 A1    Jun. 2, 2016

(30) Foreign Application Priority Data

Nov. 28, 2014 (JP) ................. 2014-242249

(51) Int. Cl.
*H02P 6/04* (2016.01)
*H02P 6/18* (2016.01)
*H02P 6/00* (2016.01)
*H02P 6/20* (2016.01)

(52) U.S. Cl.
CPC .............. *H02P 6/182* (2013.01); *H02P 6/003* (2013.01); *H02P 6/20* (2013.01)

(58) Field of Classification Search
CPC .............. H02P 6/182; H02P 6/21; H02P 6/18; H02P 6/185; H02P 6/15
See application file for complete search history.

(56) References Cited

U.S. PATENT DOCUMENTS

| 2011/0010017 A1* | 1/2011 | Jouper | H02J 3/005 700/295 |
| 2015/0123582 A1* | 5/2015 | Gu | H02P 6/182 318/400.35 |

FOREIGN PATENT DOCUMENTS

| JP | 07-337080 A | 12/1995 |
| JP | 2011-120421 A | 6/2011 |

* cited by examiner

*Primary Examiner* — Shawki S Ismail
*Assistant Examiner* — Zoheb Imtiaz
(74) *Attorney, Agent, or Firm* — Carrier Blackman & Associates, P.C.; Joseph P. Carrier; Jeffrey T. Gedeon (57) ABSTRACT

A motor drive controller is for controlling a motor having multiple phases and includes: a comparison reference voltage generator that generates a predetermined constant voltage as a comparison reference voltage; a counter-electromotive voltage comparator that compares the comparison reference voltage with a counter-electromotive voltage of each phase of the motor; and a rotation state detector that detects a rotation state of the motor based on positive/negative polarities of counter-electromotive voltages of other phases with respect to the comparison reference voltage at the time of an occurrence of a zero cross between the counter-electromotive voltage of any one phase and the comparison reference voltage.

6 Claims, 6 Drawing Sheets

| | FORWARD ROTATION | REVERSE ROTATION | FORWARD ROTATION | REVERSE ROTATION | FORWARD ROTATION | REVERSE ROTATION |
|---|---|---|---|---|---|---|
| U PHASE | NEGATIVE | POSITIVE | REFERENCE PHASE | REFERENCE PHASE | POSITIVE | NEGATIVE |
| V PHASE | POSITIVE | NEGATIVE | NEGATIVE | POSITIVE | REFERENCE PHASE | REFERENCE PHASE |
| W PHASE | REFERENCE PHASE | REFERENCE PHASE | POSITIVE | NEGATIVE | NEGATIVE | POSITIVE |

FIG. 6

MOTOR DRIVE CONTROLLER AND METHOD FOR DETECTING ROTATION STATE

BACKGROUND OF THE INVENTION

1. Field of the Invention

The present invention relates to a motor drive controller and a method for detecting rotation state.

2. Description of the Related Art

In the related art, there is a motor drive controller of a position sensor-less type that detects rotational position of a rotor based on an induced voltage of a motor instead of detecting the rotational position by a position sensor. The motor drive controller of the position sensor-less type generates a phase signal (pulse signal) by comparing an induced voltage appearing at a motor terminal in an open section (non-energized phase) with a reference voltage (equivalent neutral point electric potential) using a comparator and detects the rotational position of the rotor based on this phase signal.

In JP-A-H7-337080, an air conditioner is described which changes an activation method of a fan motor based on the rotation state thereof when the fan motor rotates according to an external disturbance such as a blowing wind. The air conditioner described in JP-A-H7-337080 determines whether or not the rotation direction of the motor is a forward direction by making a collation of rotor magnetic pole position detection signals corresponding to three phases in which a rotor magnetic pole position detection signal (generated by comparing an induced voltage (hereinafter, referred to as a "counter-electromotive voltage") of a coil with a neutral voltage) having an electrical angle of a 180° width is prepared for one phase and rotor magnetic pole position detection signals are prepared in the same way for the other two phases and rotor magnetic pole position signal patterns in the rotation direction at the time of driving the fan motor set in a rotation number setting circuit in advance. However, in a control process of comparing a counter-electromotive voltage and a neutral voltage of a coil with each other, due to generation of an insufficient counter-electromotive voltage, it is difficult to detect the counter-electromotive voltage at the time of startup and at the time of a low rotation speed.

In JP-A-2011-120421, a motor control device is described which includes a motor startup controller that, at the time of starting up a motor, executes closed loop control, in which all-phase opening for opening all the phase coils described above and set duty drive are repeated, executes detection of a rotation state, which is one state of forward rotation, stop, reverse rotation, of a sensorless brushless motor, based on detection of a voltage zero cross between a counter-electromotive force during the opening of all the phases and comparison reference electric potential and transits to the process of current control according a phase at which the sensorless brushless motor is in the forward rotation based on a determined result of the detection of the rotation state. The motor control device described in JP-A-2011-120421, at the time of starting up the motor, executes the closed loop control, in which all-phase opening for opening all the phase coils and the set duty drive are repeated, and detects the rotation direction of the motor based on a detection of a voltage zero cross between a counter-electromotive voltage at the time of opening all the phases and a comparison reference voltage. In other words, a voltage zero cross is detected during an extremely low rotation speed that is forcibly caused at the time of startup, and the rotation direction is detected based on the signal.

However, the motor control device described in JP-A-2011-120421 may have the following problems. In the detection of a rotation direction, since the rotation direction is determined through monitoring of an elapse of a change in the counter-electromotive voltage during a predetermined period, there are cases where it is difficult to make detection according to condition of the magnitude and the time of an external disturbance such as a blowing wind. In addition, it is necessary to execute the closed loop control at the time of start-up, and accordingly, there is a problem in that the control process becomes complicated.

SUMMARY OF THE INVENTION

One of objects of the present invention is to provide a motor drive controller and a method for detecting rotation state capable of determining a rotation state in a short time.

According to an illustrative embodiment of the present invention, there is provided a motor drive controller for controlling a motor having multiple phases. The motor drive controller includes: a comparison reference voltage generator that generates a predetermined constant voltage as a comparison reference voltage; a counter-electromotive voltage comparator that compares the comparison reference voltage with a counter-electromotive voltage of each phase of the motor; and a rotation state detector that detects a rotation state of the motor based on positive/negative polarities of counter-electromotive voltages of other phases with respect to the comparison reference voltage at the time of an occurrence of a zero cross between the counter-electromotive voltage of any one phase and the comparison reference voltage.

According to another illustrative embodiment of the present invention, there is provided a method for detecting rotation state of a motor having multiple phases. The method includes: generating a predetermined constant voltage as a comparison reference voltage; comparing the comparison reference voltage with a counter-electromotive voltage of each phase of the motor; and detecting a rotation state of the motor based on positive/negative polarities of the counter-electromotive voltages of the other phases with respect to the comparison reference voltage at the time of an occurrence of a zero cross between the counter-electromotive voltage of any one phase and the comparison reference voltage.

DETAILED DESCRIPTION

Figure 1:
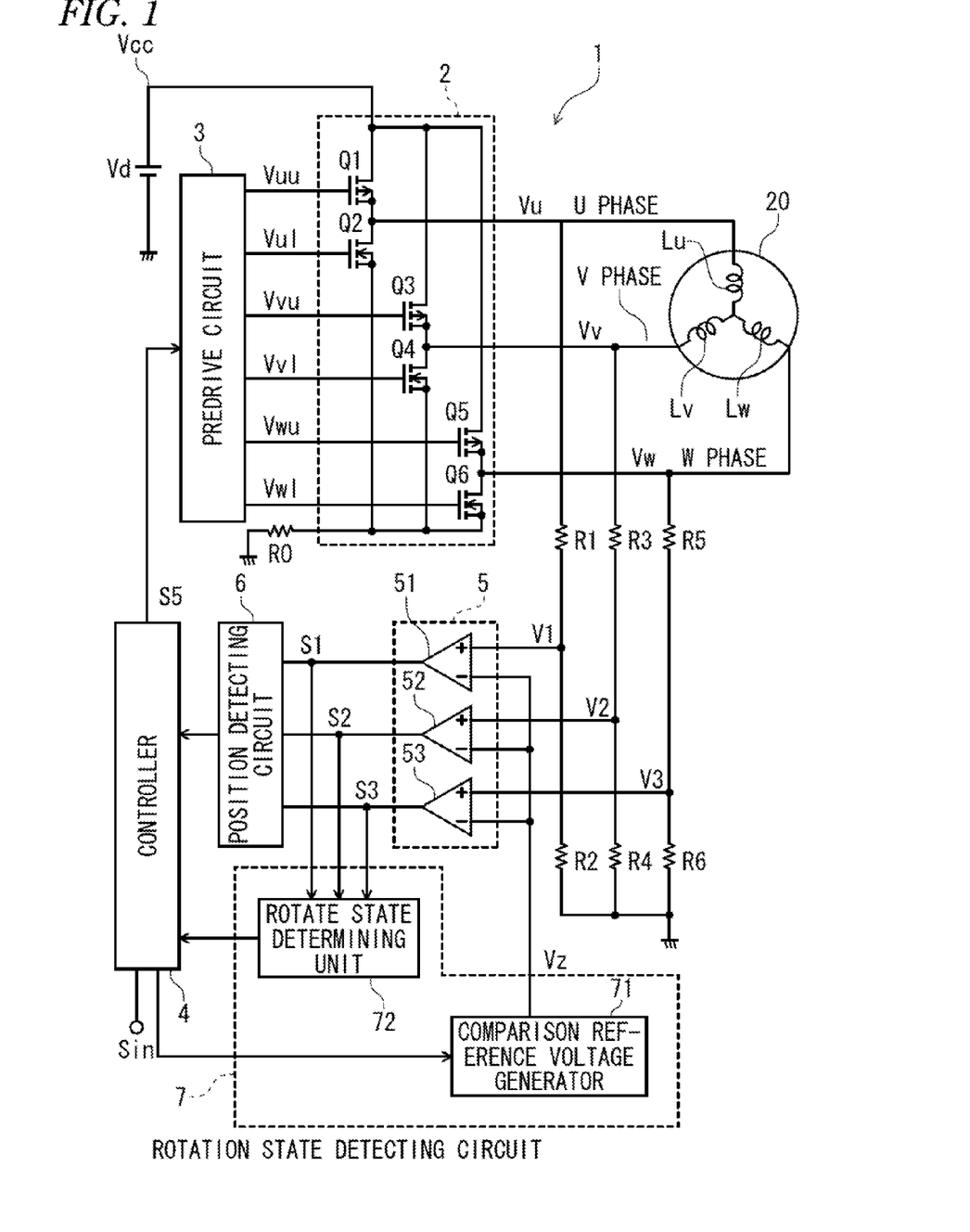
FIG. 1 is a schematic diagram that illustrates a configuration of a motor drive controller according to an embodiment of the present invention.

Hereinafter, an embodiment of the present invention will be described in detail with reference to the drawings. FIG. 1 is a block diagram that illustrates the circuit configuration of a drive control device 1 of a motor 20 according to the embodiment. The drive control device is utilized for determining a rotation state corresponding to each rotation speed of the motor 20.

As shown in FIG. 1, the motor 20 according to the embodiment is a three-phase brushless DC motor and includes coils Lu, Lv, and Lw of phases and a rotor (not illustrated in the drawing). One ends of the coils Lu, Lv, and Lw is configured to have a Y-connection. The other end of the coil Lu is connected to a U phase, the other end of the coil Lv is connected to a V phase, and the other end of the coil Lw is connected to a W phase. A three-phase AC is input to the U phase, the V phase, and the W phase from an inverter circuit 2, whereby the motor 20 is driven to rotate.

The drive control device 1 (an example of a motor drive controller) of the motor 20 includes: an inverter circuit 2 that drives the motor 20; and a predrive circuit 3 (an example of a motor driver). The drive control device 1 further includes: a counter-electromotive voltage comparator 5 (an example of a counter-electromotive voltage comparator); a position detecting circuit 6; a controller 4; and a rotation state detecting circuit 7 (an example of a rotation state detector).

The drive control device 1 is connected to a DC power supply Vd and is connected to the motor 20 through three phases of a U-phase wiring, a V-phase wiring, and a W-phase wiring. The drive control device 1 applies a drive voltage to the motor 20, thereby controlling the rotation of the motor 20. An inter-terminal voltage Vu is applied to the U phase. An inter-terminal voltage Vv is applied to the V phase. An inter-terminal voltage Vw is applied to the W phase.

The motor driver is configured by the inverter circuit 2 and the predrive circuit 3. The DC power supply Vd applies a power supply voltage Vcc to the motor driver, thereby supplying power thereto. The motor driver receives power supply from the DC power supply Vd and supplies drive currents to the coils Lu, Lv, and Lw of the U phase, the V phase, and the W phase of the motor 20 based on a drive control signal S5 supplied from the controller 4, thereby rotating the rotor. The motor driver drives the motor 20 in accordance with a sine wave drive system.

The inverter circuit 2 (a part of the motor driver) is connected to the DC power supply Vd and receives supply of power. The inverter circuit 2 is connected to the predrive circuit 3 (a part of the motor driver) and the coils Lu, Lv, and Lw of the phases included in the motor 20. The inverter circuit 2 applies currents to the coils Lu, Lv, and Lw of the phases of the motor 20 based on drive signals Vuu to Vwl of the predrive circuit 3.

The inverter circuit 2 includes a switching bridge of the U phase that is acquired by connecting switching devices Q1 and Q2 in series, a switching bridge of the V phase that is acquired by connecting switching devices Q3 and Q4 in series, and a switching bridge of the W phase that is acquired by connecting switching devices Q5 and Q6 in series. For example, these switching devices Q1 to Q6 are field effect transistors (FET). The inverter circuit 2 is connected to the DC power supply Vd and is further connected to a resistor R0.

The switching bridge of the U phase includes the switching device Q1 disposed on the upper arm side and the switching device Q2 disposed on the lower arm side. A drain terminal of the switching device Q1 is connected to the positive electrode of the DC power supply Vd. A source terminal of the switching device Q1 outputs an AC signal of the U phase and is connected to a drain terminal of the switching device Q2. A source terminal of the switching device Q2 is connected to the ground (the negative electrode of the DC power supply Vd) through the resistor R0. A gate terminal of the switching device Q1 and a gate terminal of the switching device Q2 are connected to the predrive circuit 3.

The switching bridge of the V phase includes the switching device Q3 disposed on the upper arm side and the switching device Q4 disposed on the lower arm side. A drain terminal of the switching device Q3 is connected to the positive electrode of the DC power supply Vd. A source terminal of the switching device Q3 outputs an AC signal of the V phase and is connected to a drain terminal of the switching device Q4. A source terminal of the switching device Q4 is connected to the ground (the negative electrode of the DC power supply Vd) through the resistor R0. A gate terminal of the switching device Q3 and a gate terminal of the switching device Q4 are connected to the predrive circuit 3.

The switching bridge of the W phase includes the switching device Q5 disposed on the upper arm side and the switching device Q6 disposed on the lower arm side. A drain terminal of the switching device Q5 is connected to the positive electrode of the DC power supply Vd. A source terminal of the switching device Q5 outputs an AC signal of the W phase and is connected to a drain terminal of the switching device Q6. A source terminal of the switching device Q6 is connected to the ground (the negative electrode of the DC power supply Vd) through the resistor R0. A gate terminal of the switching device Q5 and a gate terminal of the switching device Q6 are connected to the predrive circuit 3.

The inverter circuit 2 includes: the upper arm-side switching devices Q1, Q3, and Q5 respectively connected between the coils Lu, Lv, and Lw of the motor 20 having the phases and one terminal (positive-electrode terminal) of the DC power supply Vd; and the lower arm-side switching devices Q2, Q4, and Q6 respectively connected between the coils Lu, Lv, and Lw having the phases and the other terminal (negative-electrode terminal) of the DC power supply Vd through the resistor R0.

When power is supplied from the DC power supply Vd, and the drive signals Vuu to Vwl are input from the predrive circuit 3, the inverter circuit 2 causes three-phase AC currents to flow into the U-phase wiring, the V-phase wiring, and the W-phase wiring of the motor 20.

The predrive circuit 3 (a part of the motor driver) configures a motor driver by forming a combination with the connected inverter circuit 2 and is connected to the controller 4. The predrive circuit 3, for example, includes six gate drive circuits and generates the drive signals Vuu to Vwl used for driving the inverter circuit 2.

The counter-electromotive voltage comparator 5 includes comparators 51, 52, and 53 of the phases. A node of the U phase has a voltage divided into resistors R1 and R2 and is connected to one input terminal of the comparator 51. A node of the V phase has a voltage divided into resistors R3 and R4 and is connected to one input terminal of the comparator 52. A node of the W phase has a voltage divided into resistors R5 and R6 and is connected to one input terminal of the comparator 53. The resistors R1, R3, and R5 have a same resistance value. The resistors R2, R4, and R6 have a same resistance value. Accordingly, the voltage division ratios of the phases are the same. The other input terminals of the comparators 51, 52, and 53 are connected to the rotation state detecting circuit 7.

Here, there are cases where the motor 20 rotates when the coils Lu, Lv, and Lw of the motor 20 are not being energized, but there is an external disturbance such as a blowing wind including a case where the motor 20 is used as a fan motor. Induced voltages generated in the coils Lu, Lv, and Lw at such a time are called "counter-electromotive voltages".

The comparator 51 of the counter-electromotive voltage comparator 5 includes: a non-inverted input terminal; an inverted-input terminal; and an output terminal. When a voltage applied to the non-inverted input terminal is lower than a voltage applied the inverted input terminal, the comparator 51 outputs a voltage of an L level to the output terminal. On the other hand, when the voltage applied to the non-inverted input terminal exceeds the voltage applied to the inverted input terminal, the comparator 51 outputs a voltage of an H level to the output terminal.

A phase voltage V1 acquired by dividing the inter-terminal voltage Vu corresponding to the induced voltage of the coil Lu is input to the non-inverted input terminal of the comparator 51. A comparison reference voltage Vz is input to the non-inverted input terminal of the comparator 51. The comparator 51 compares the phase voltage V1 with the comparison reference voltage Vz and generates a phase signal S1. When the phase voltage V1 is negative relative to the comparison reference voltage Vz, the phase signal S1 has the L level. On the other hand, when the phase voltage V1 is positive relative to the comparison reference voltage Vz, the phase signal S1 has the H level.

A phase voltage V2 acquired by dividing the inter-terminal voltage Vv corresponding to the induced voltage of the coil Lv is input to the non-inverted input terminal of the comparator 52. The comparison reference voltage Vz is input to the non-inverted input terminal of the comparator 52. The comparator 52 compares the phase voltage V2 with the comparison reference voltage Vz and generates a phase signal S2. When the phase voltage V2 is negative relative to the comparison reference voltage Vz, the phase signal S2 has the L level. On the other hand, when the phase voltage V2 is positive relative to the comparison reference voltage Vz, the phase signal S2 has the H level.

A phase voltage V3 acquired by dividing the inter-terminal voltage Vw corresponding to the induced voltage of the coil Lw is input to the non-inverted input terminal of the comparator 53. The comparison reference voltage Vz is input to the non-inverted input terminal of the comparator 53. The comparator 53 compares the phase voltage V3 with the comparison reference voltage Vz and generates a phase signal S3.

When the phase voltage V3 is negative relative to the comparison reference voltage Vz, the phase signal S3 has the L level. On the other hand, when the phase voltage V3 is positive relative to the comparison reference voltage Vz, the phase signal S3 has the H level.

In this way, the comparators 51 to 53 of the counter-electromotive voltage comparator 5 can respectively compare the inter-terminal voltages Vu, Vv, and Vw corresponding to the phase voltages V1 to V3 with the comparison reference voltage Vz. The counter-electromotive voltage comparator 5 outputs the generated phase signals S1 to S3 to the position detecting circuit 6 and the rotation state detector 72 of the rotation state detecting circuit 7.

The position detecting circuit 6 (an example of a position detector) generates a position detection signal S4 representing a rotational position of the rotor based on the phase signals S1 to S3 (an example of position adjustment signals) supplied from the counter-electromotive voltage comparator 5 and outputs the generated position detection signal to the controller 4.

The controller 4 is connected to an external device not illustrated in the drawing, the position detecting circuit 6, and the rotation state detecting circuit 7. The controller 4 generates a drive control signal S5 based on a rotation speed instruction signal Sin input from the outside, the position detection signal S4 supplied from the position detecting circuit 6, and a result of the determination of the rotation state that is supplied from the rotation state detecting circuit 7.

The rotation state detecting circuit 7 includes: a comparison reference voltage generator 71; and a rotation state detector 72. The comparison reference voltage generator 71 generates the comparison reference voltage Vz that is a predetermined constant voltage. When a zero cross between the phase voltage V1 to V3 of any one phase and the comparison reference voltage Vz occurs, the rotation state detector 72 determines the rotation state of the motor 20 based on the positive/negative polarities of the phase voltages V1 to V3 of the other phases with respect to the comparison reference voltage Vz.

More specifically, when a zero cross between a rise of the phase voltage V1 of the U phase and the comparison reference voltage Vz occurs, in a case where both of the phase voltage V2 of the V phase leading this phase and the phase voltage V3 of the W phase retarding this phase have the same polarity with respect to the comparison reference voltage Vz, the rotation state detector 72 determines that the rotation speed of the motor 20 to be less than a predetermined speed. The rotation state detector 72 outputs the result of the determination of the state determination to the controller 4.

The controller 4, the counter-electromotive voltage comparator 5, the position detecting circuit 6, the comparison reference voltage generator 71, and the rotation state detector 72 may be implemented as a microcomputer.

Hereinafter, how the drive control device 1 instantly determines the rotation direction without performing closed loop control at the time of startup will be described. The inventors of the present invention found that, when a zero cross between a counter-electromotive voltage of any one phase among counter-electromotive voltages of three phases including the U phase, the V phase, and the W phase and a comparison reference voltage occurs, focusing on the other two phases, the other two phases take specific positive/negative states with respect to the comparison reference voltage.

In other words, when a zero cross between a counter-electromotive voltage of a predetermined phase and the comparison reference voltage occurs, the drive control device 1 of the motor 20 according to the present invention has a feature of determining a rotation direction based on positive/negative states of counter-electromotive voltages of the other phases with respect to the comparison reference voltage. When a zero cross between the counter-electromotive of a predetermined phase and the comparison reference voltage occurs, a rotation state can be determined based on the positive/negative states of the counter-electromotive voltages of the other phases with respect to the comparison reference voltage.

The comparison reference voltage generator 71 of the rotation state detecting circuit 7 sets the comparison reference voltage Vz based on the amplitude of the counter-electromotive voltage generated in each phase when the motor 20 rotates at a predetermined speed. The rotation state detector 72 determines the rotation state of the motor 20 based on the positive/negative polarities of the other phases with respect to the comparison reference voltage Vz at the time of an occurrence of an intersection (zero cross) between one of the phase voltages V1 to V3 and the comparison reference voltage Vz.

Figure 2:
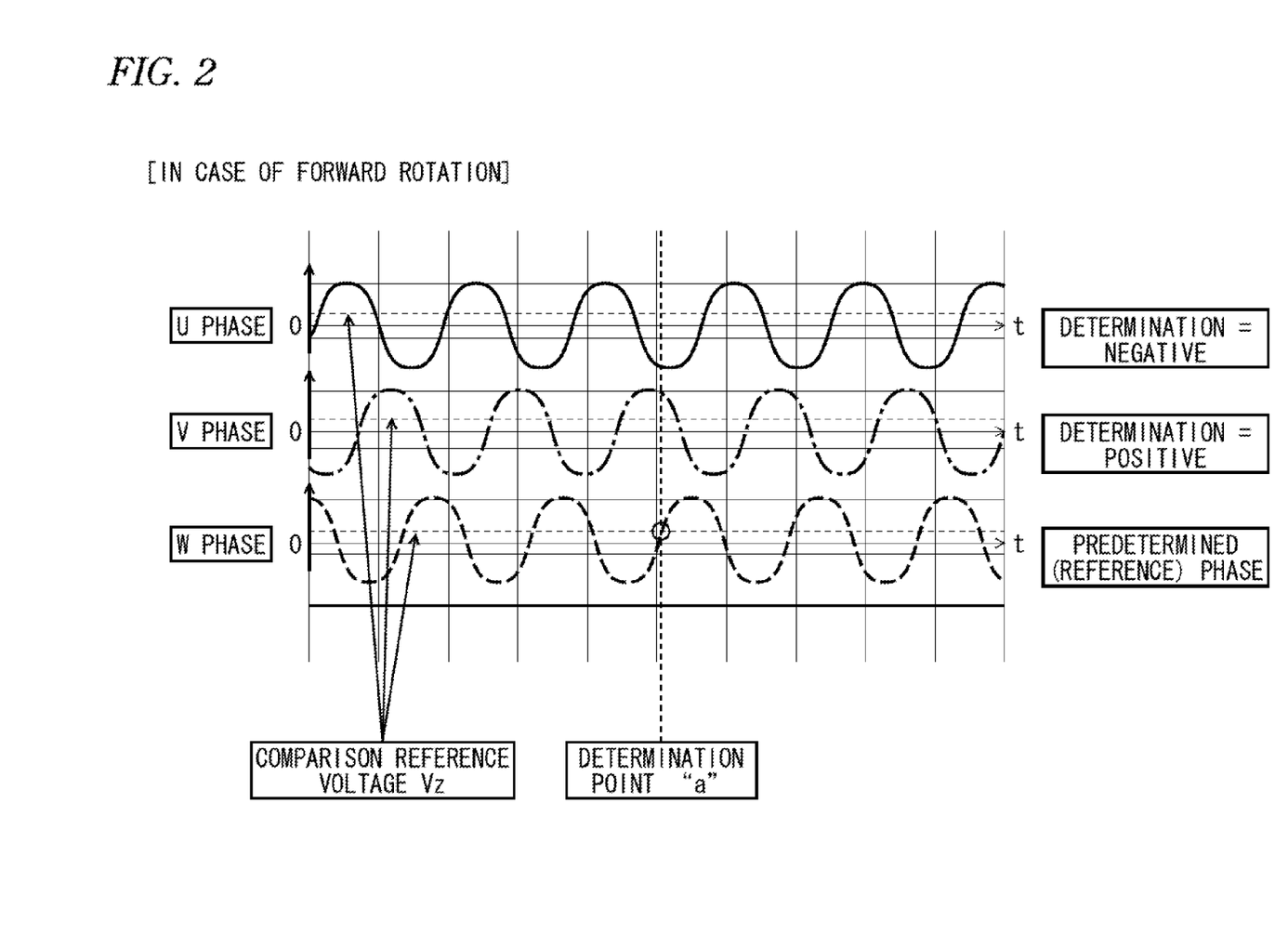
FIG. 2 is a timing diagram that illustrates waveforms of phase voltages acquired by dividing counter-electromotive voltages of phases with respect to a comparison reference voltage in a case where a motor of the motor drive controller according to the embodiment is in forward rotation.
Figure 3:
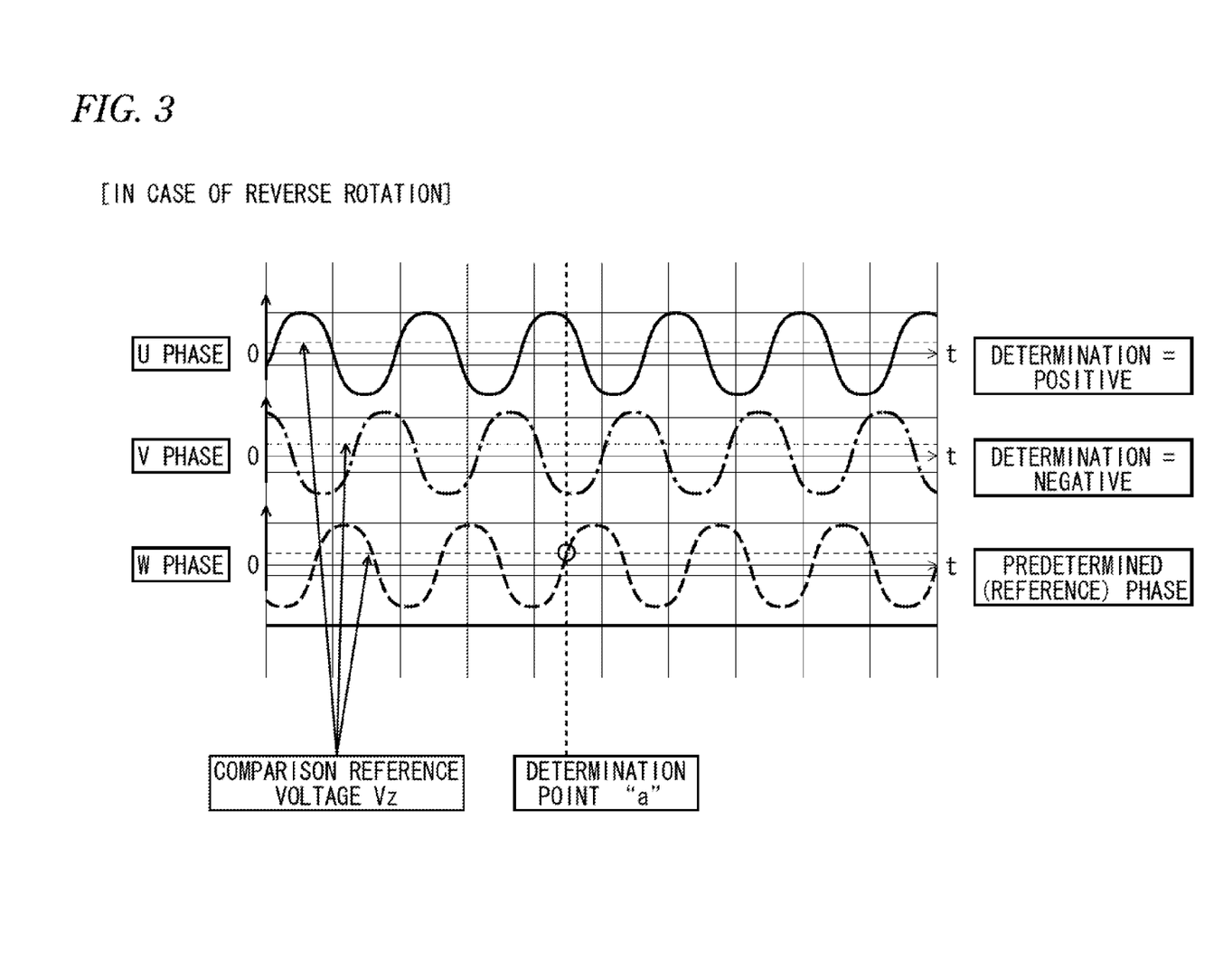
FIG. 3 is a timing diagram that illustrates waveforms of phase voltages acquired by dividing counter-electromotive voltages of the phases with respect to the comparison reference voltage in a case where the motor of the motor drive controller according to the embodiment is in reverse rotation.

FIGS. 2 and 3 are diagrams that illustrate a method of determining the rotation state of the motor 20. FIG. 2 is a timing diagram that illustrates the comparison reference voltage Vz and the waveforms of phase voltages acquired by dividing counter-electromotive voltages of phases in a case where the motor 20 is in forward rotation.

In FIG. 2, the vertical axis represents the phase voltages of the U phase, the V phase, and the W phase and the comparison reference voltage Vz. In FIG. 2, the horizontal axis represents the time. A solid line represents the waveform of the phase voltage of the U phase. A dashed line represents the waveform of the phase voltage of the V phase. A thick broken line represents the waveform of the phase voltage of the W phase. A thin broken line represents the comparison reference voltage Vz.

Here, as an example, the W phase is set as the reference phase at a determination point "a". For the phases including the U phase, the V phase, and the W phase, the voltage level of the comparison reference voltage Vz is the same. Here, a case will be described in which the rises of the phase voltages of the phases with respect to the comparison reference voltage Vz are compared. Although the falls of the phase voltages of the phases with respect to the comparison reference voltage Vz may be compared, in such a case, a condition of positive/negative polarities to be described later are reversed.

The timing at which the phase voltage of each phase intersects (zero cross) the comparison reference voltage Vz occurs six times per one rotation. At the determination point "a", a zero cross between the rise of the phase voltage of the W phase and the comparison reference voltage Vz occurs.

At this determination point "a", the positive/negative polarities of the phase voltage of the U phase and the phase voltage of the V phase with respect to the comparison reference voltage Vz are determined. Based on such comparison results, the rotation direction of the motor 20 can be determined. In other words, in a case where the phase voltage of the U phase with respect to the comparison reference voltage Vz is negative, and the phase voltage of the V phase with respect to the comparison reference voltage Vz is positive, the rotation direction of the motor 20 can be determined to be a forward direction.

As the rotation speed of the motor 20 increases, the amplitude of the phase voltage of each phase increases. Thus, by shifting the comparison reference voltage Vz from the center of the amplitude of the phase voltage of each phase, an excess of the rotation speed of the motor 24 over a predetermined value can be detected as well. When the phase voltage of each phase does not intersect the comparison reference voltage Vz, the rotation speed of the motor 20 can be detected to be the predetermined value or less.

FIG. 3 is a timing diagram that illustrates the comparison reference voltage Vz and the waveforms of phase voltages acquired by dividing counter-electromotive voltages of phases in a case where the motor 20 is in reverse rotation. In FIG. 3, the vertical axis represents the phase voltages of the U phase, the V phase, and the W phase and the comparison reference voltage Vz. In FIG. 3, the horizontal axis represents the time. Hereinafter, the meanings of a solid line, a dashed line, a thick broken line, and a thin broken line are the same as those of FIG. 2.

Here, as an example, the W phase is set as the reference phase at a determination point "a". The timing at which the phase voltage of each phase intersects (zero cross) the comparison reference voltage Vz occurs six times per one rotation. At the determination point "a", a zero cross between the rise of the phase voltage of the W phase and the comparison reference voltage Vz occurs.

At this determination point "a", the positive/negative polarities of the phase voltage of the U phase and the phase voltage of the V phase with respect to the comparison reference voltage Vz are determined. Based on such comparison results, the rotation direction of the motor 20 can be determined. In other words, in a case where the phase voltage of the U phase with respect to the comparison reference voltage Vz is positive, and the phase voltage of the V phase with respect to the comparison reference voltage Vz is negative, it is determined that the motor 20 is in reverse rotation.

Similar to the case of the forward rotation, as the rotation speed of the motor 20 increases, the amplitude of the phase voltage of each phase increases. Thus, by shifting the comparison reference voltage Vz from the center of the amplitude of the phase voltage of each phase, an excess of the rotation speed of the motor 24 over a predetermined value can be detected as well. When the phase voltage of each phase does not intersect the comparison reference voltage Vz, the rotation speed of the motor 20 can be detected to be the predetermined value or less.

In this way, at the time of an occurrence of a zero cross between the phase voltage of the reference phase and the comparison reference voltage Vz, based on positive/negative polarities of the phase voltages of the other phases with respect to the comparison reference voltage Vz, the rotation direction and the rotation speed of the motor 20 can be determined.

The comparison reference voltage Vz can be arbitrarily set. For example, when the comparison reference voltage Vz is set to be low, up to a rotation direction at the time of a low rotation speed can be detected. On the other hand, when the comparison reference voltage Vz is set to be high, the rotation speed can be detected with being restricted to a rotation direction at the time of a high rotation speed. In the embodiment, the comparison reference voltage generator 71 generates the comparison reference voltage Vz that is a predetermined constant voltage. In addition, the comparison reference voltage generator 71 adjusts the absolute value of the comparison reference voltage Vz based on the amplitude of the phase voltage generated in each phase when the motor 20 rotates at a predetermined speed.

Figure 4:
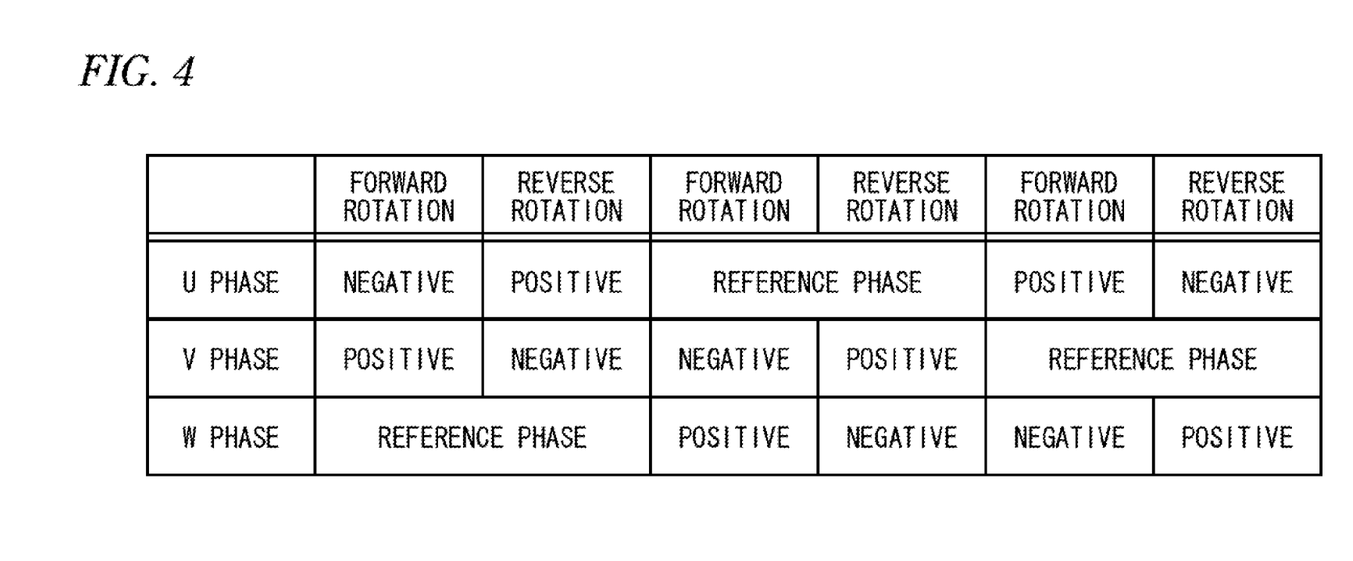
FIG. 4 is a diagram that illustrates an example of a determination condition for the rotation direction of the motor of the motor drive controller according to the embodiment.

FIG. 4 is a diagram that illustrates an example of a determination condition for the rotation direction of the motor 20 according to the embodiment. This determination condition is a case where the rise of a phase voltage intersects the comparison reference voltage Vz.

In the embodiment, by using a zero cross of the rise of the phase voltage of the reference phase for the comparison reference voltage Vz as a base point, the rotation state of the motor 20 is determined based on the positive/negative polarities of the phase voltages of the other phases. In addition, by using the zero cross of the fall of the phase voltage as a base point, the rotation state is determined. This determination condition, for example, is stored in the controller 4.

In a case where the rise of the phase voltage of the W phase intersects the comparison reference voltage Vz, and, when the W phase is used as the reference, the phase voltage of the U phase with respect to the comparison reference voltage Vz is negative, and the phase voltage of the V phase is positive, the motor is in forward rotation. On the other, in a case where the phase voltage of the U phase is positive with respect to the comparison reference voltage Vz, and the phase voltage of the V phase is negative, the motor is in reverse rotation.

In a case where the rise of the phase voltage of the U phase intersects the comparison reference voltage Vz, and, when the U phase is used as the reference, the phase voltage of the V phase with respect to the comparison reference voltage Vz is negative, and the phase voltage of the W phase is positive, the motor is in forward rotation. On the other, in a case where the phase voltage of the V phase is positive with respect to the comparison reference voltage Vz, and the phase voltage of the W phase is negative, the motor is in reverse rotation.

In a case where the rise of the phase voltage of the V phase intersects the comparison reference voltage Vz, and, when the V phase is used as the reference, the phase voltage of the W phase with respect to the comparison reference voltage Vz is negative, and the phase voltage of the U phase is positive, the motor is in forward rotation. In a case where the phase voltage of the W phase is positive with respect to the comparison reference voltage Vz, and the phase voltage of the U phase is negative, the motor is in reverse rotation. In a case where the fall of a phase voltage intersects the comparison reference voltage Vz, this positive/negative condition can be applied as the reverse thereof.

For example, in a case where the fall of the phase voltage of the W phase intersects the comparison reference voltage Vz as a zero cross, the phase voltage of the U phase with respect to the comparison reference voltage Vz is positive, and the phase voltage of the V phase is negative, the rotation direction of the motor 20 is determined to be a forward direction.

When a zero cross between the rise of the phase voltage of any one phase and the comparison reference voltage Vz occurs, in a case where both the phase voltage of another phase leading the phase and the phase voltage of another phase retarding the phase are negative with respect to the comparison reference voltage Vz, the rotation state detector 72 determines that the rotation speed of the motor 20 is less than a predetermined speed.

In this way, by raising the voltage of the comparison reference voltage Vz corresponding to the comparison reference voltage Vz, a detectable rotation speed can be raised. In other words, by raising the comparison reference voltage Vz, it can be determined whether or not the rotation speed is a high rotation speed. On the other hand, by lowering the comparison reference voltage Vz, a lower rotation speed can be detected.

Figure 5:
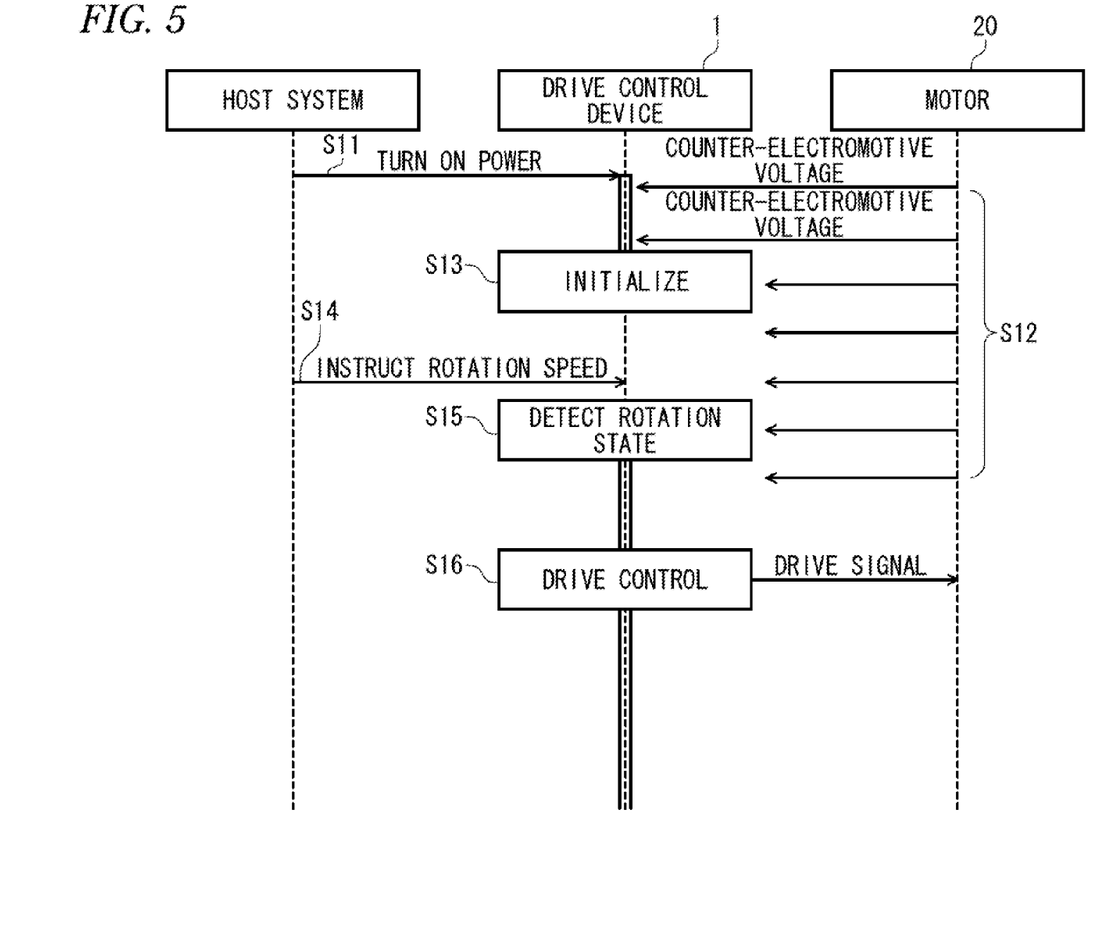
FIG. 5 is a control sequence diagram that illustrates a specific example of a rotation state detection sequence of a host system, a drive control device, and a motor.

FIG. 5 is a control sequence diagram that illustrates a specific example of a rotation state detection sequence of a host system, the drive control device 1, and the motor 20. In Step S11, the host system managing the drive control device 1 (see FIG. 1) turns on the power of the drive control device 1 to start it up. In accordance with this, in Step S12, the drive control device 1 receives the input of an induced voltage (counter-electromotive voltage) of each phase from the motor 20 (see FIG. 1). There are cases where the motor 20 rotates due to an external disturbance such as a blowing wind even when the coils Lu, Lv, and Lw of the motor 20 are not being energized. The induced voltages (counter-electromotive voltages) generated in the coils Lu, Lv, and Lw at this time are input to the drive control device 1.

In Step S13, the controller 4 (see FIG. 1), in order to determine the rotation state, initializes the comparison reference voltage generator 71 and the rotation state detector 72 of the rotation state detecting circuit 7. The comparison reference voltage generator 71 generates the comparison reference voltage Vz that is a predetermined constant voltage set in advance through the initialization process. The rotation state detector 72 resets the internal state through the initialization process and starts a rotation state determining operation.

In Step S14, the controller 4 receives a rotation speed instruction from the host system. By changing the voltage of the comparison reference voltage Vz based on this rotation speed instruction, not only the rotation direction but also the rotation state can be determined. Particularly, a rotation state such as high-speed reverse rotation can be appropriately detected.

For example, by raising the comparison reference voltage Vz, it can be determined whether or not the rotation is higher-speed reverse rotation. By lowering the comparison reference voltage Vz, up to reverse rotation at a lower speed can be detected. The rotation speed instruction from the host system may not be issued in a case where the comparison reference voltage Vz is not changed, and the rotation speed instruction may be configured to be received regardless of presence/absence of a change in the comparison reference voltage Vz.

In Step S15, the rotation state detecting circuit 7 determines the rotation state of the motor 20 based on the output of the counter-electromotive voltage comparator 5. More specifically, the comparison reference voltage generator 71 generates the comparison reference voltage Vz that is a predetermined constant voltage, and the counter-electromotive voltage comparator 5 compares the comparison reference voltage Vz with a phase voltage acquired by dividing the counter-electromotive voltage of each phase of the motor 20.

The rotation state detector 72 determines the rotation state of the motor 20 based on the positive/negative polarities (see the determination table for the rotation direction illustrated in FIG. 4) of the phase voltages of the other phases with respect to the comparison reference voltage Vz at the time of an occurrence of a zero cross between the phase voltage of the reference phase and the comparison reference voltage Vz.

In Step S16, after the determination of the rotation state, the drive control device 1 executes a normal drive control process. More specifically, the controller 4 outputs a drive control signal S5 to the predrive circuit 3. The predrive circuit 3 generates drive signals Vuu to Vwl used for driving the inverter circuit 2 based on the drive control signal S5, and the inverter circuit 2 receives the supply of power from the DC power supply Vd and supplies drive currents to the coils Lu, Lv, and Lw of the U phase, the V phase, and the W phase of the motor 20, thereby rotating the rotor. The motor 20 is driven in steady rotation.

Figure 6:
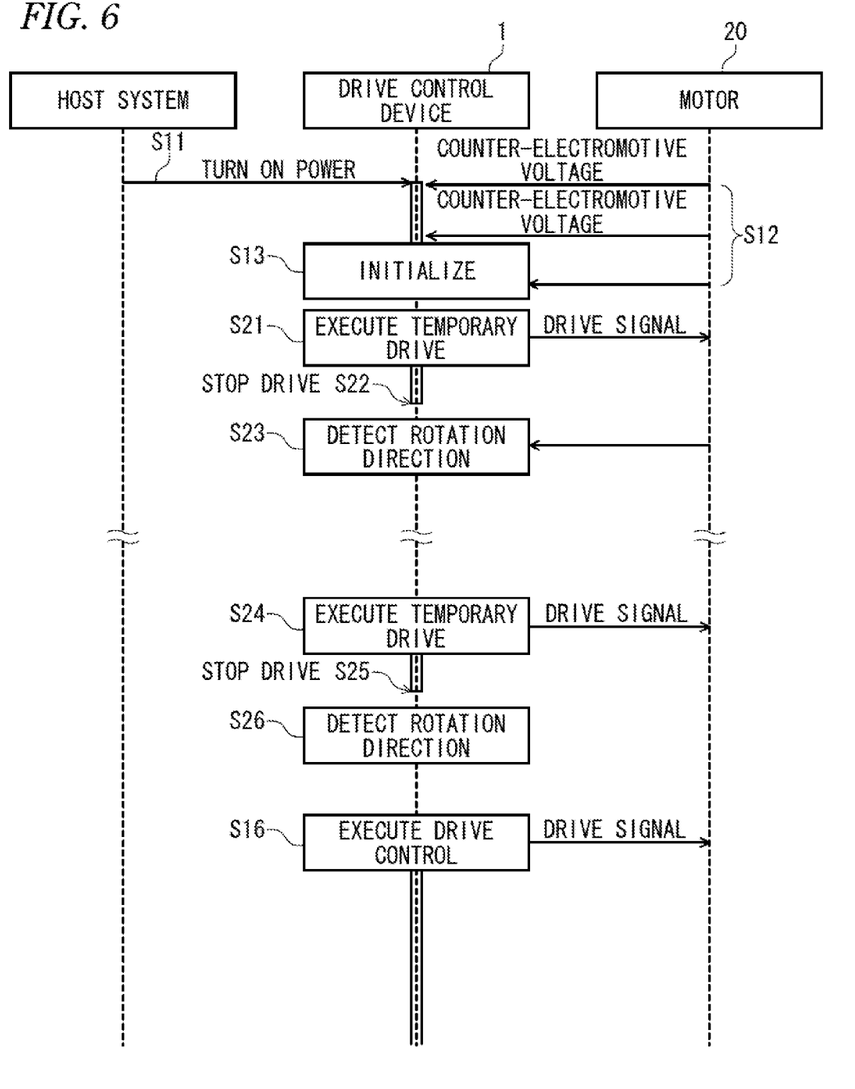
FIG. 6 is a control sequence diagram that illustrates a modified example of a rotation state detection sequence of a host system, a drive control device, and a motor.

FIG. 6 is a control sequence diagram that illustrates a modified example of a rotation state detection sequence of a host system, the drive control device 1, and the motor 20. The same reference numeral is assigned to the same component as that illustrated in FIG. 5. In Step S11, the host system managing the drive control device 1 (see FIG. 1) turns on the power of the drive control device 1 to start it up. In accordance with this, in Step S12, the drive control device 1 receives the input of an induced voltage (counter-electromotive voltage) of each phase from the motor 20 (see FIG. 1). Induced voltages (counter-electromotive voltages) generated in the coils Lu, Lv, and Lw are input to the drive control device 1.

In Step S13, the controller 4 (see FIG. 1), in order to determine the rotation state, initializes the comparison reference voltage generator 71 and the rotation state detector 72 of the rotation state detecting circuit 7. The comparison reference voltage generator 71 generates the comparison reference voltage Vz that is a predetermined constant voltage set in advance through the initialization process. The rotation state detector 72 resets the internal state through the initialization process and starts a rotation state determining operation. In Step S21, the drive control device 1 executes temporary drive.

More specifically, the controller 4 outputs a drive control signal S5 to the predrive circuit 3. The predrive circuit 3 generates drive signals Vuu to Vwl used for driving the inverter circuit 2 based on the drive control signal S5. The inverter circuit 2 supplies the drive currents to the coils Lu, Lv, and Lw of the motor 20, thereby rotating the rotor. In accordance with this temporary drive, the motor 20 generates predetermined torque. In Step S22, the controller 4 stops the temporary drive of the motor 20. In this way, the counter-electromotive force of each phase can be detected.

In Step S23, the rotation state detecting circuit 7 determines the rotation state of the motor 20 based on the output of the counter-electromotive voltage comparator 5. More specifically, the comparison reference voltage generator 71 generates the comparison reference voltage Vz that is a predetermined constant voltage and compares the comparison reference voltage Vz with the phase voltage of each phase of the motor 20. In this way, the positive/negative polarity of each phase of the motor 20 with respect to the comparison reference voltage Vz can be determined.

The rotation state detector 72 determines the rotation state of the motor 20 based on the positive/negative polarities of the phase voltages of the other phases with respect to the comparison reference voltage Vz at the time of an occurrence of a zero cross between the phase voltage of the reference phase and the comparison reference voltage Vz. This determination process ends in a relatively short time corresponding to 120 degrees rotation of the motor 20. The temporary drive, the stopping of the drive, and the rotation state determining are continued until the motor 20 is determined to be in forward rotation.

The controller 4 executes the temporary drive again in Step S24 and stops the temporary drive of the motor in Step S25.

In Step S26, the rotation state detecting circuit 7 determines the rotation state of the motor 20 based on the output of the counter-electromotive voltage comparator 5. The rotation state detecting circuit 7 determines that the rotation state of the motor 20 is the forward rotation through this rotation state determining process. In the subsequent Step S16, the drive control device 1 executes a normal drive control process.

In this way, in the control sequence illustrated in FIG. 6, the rotation state is detected after torque is applied through the temporary drive of the motor 20 and, when the motor 20 is at a predetermined rotation speed and is in the forward rotation, the process transits to the steady rotation drive process.

As described above, the drive control device 1 of the motor 20 according to the embodiment includes: the comparison reference voltage generator 71 that generates the comparison reference voltage Vz that is a predetermined constant voltage; the counter-electromotive voltage comparator 5 that compares the comparison reference voltage Vz with the phase voltage of each phase of the motor 20; and the rotation state detector 72 that determines the rotation state of the motor 20 based on the positive/negative polarities of the phase voltages of the other phases with respect to the comparison reference voltage Vz at the time of an occurrence of a zero cross between the phase voltage of any one phase and the comparison reference voltage Vz. Accordingly, the rotation state can be determined in a short time.

For example, since the determination can be made in a time corresponding to 120 degrees rotation of the motor 20, the rotation direction at the time of a zero cross can be determined in a short time, whereby the startup time of the motor 20 can be shortened.

The present invention is not limited to the embodiment described above, but a change can be made therein in a range not departing from the concept of the present invention, for example, like the following (a) to (h).

(a) In the determination of the rotation state according to the embodiment described above, while the rise of the phase voltage of each phase is compared with the comparison reference voltage Vz, the fall of the phase voltage of each phase may be further compared with the comparison reference voltage Vz. In the case of the fall, the determination of the positive/negative polarities is the reverse of that of the case of the rise. In this way, the rotation state can be determined in a time corresponding to the 60 degrees rotation of the motor 20.

(b) At least a part of each constituent components of the drive control device 1 may be implemented as hardware or as software executed by a processor.

(c) The motor 20 is not limited to the three-phase brushless motor but may be a motor of a different type. In addition, the number of phases of the motor 20 is not limited to three.

(d) The drive system of the motor 20 is not limited to the sine wave drive system but, for example, may be a rectangular wave drive system.

(e) At least a part of the drive control device 1 may be configured by an integrated circuit (IC).

(f) The circuit block configuration of the rotation state detecting circuit 7 illustrated in FIG. 1 is a specific example, but the configuration is not limited thereto.

(g) The control sequences illustrated in FIGS. 5 and 6 are examples, and the process is not limited to the process of such steps. Thus, another process may be inserted between the steps.

(h) As the predetermined comparison reference voltage Vz corresponding to each rotation speed of the motor 20, an appropriate value may be set based on a theory, actual measurement results, and the like and be stored in a storage unit (not illustrated in the diagram). In addition, the value of the comparison reference voltage Vz corresponding to each rotation speed of the motor 20 may be stored in a storage unit.

According to the present invention, a motor drive controller and a method for detecting rotation state capable of determining the rotation state in a short time can be provided.

What is claimed is:

1. A motor drive controller for controlling a motor having multiple phases, the motor drive controller comprising:
a comparison reference voltage generator that generates a predetermined constant voltage as a comparison reference voltage;
a counter-electromotive voltage comparator that compares the comparison reference voltage with a counter-electromotive voltage of each phase of the motor; and
a rotation state detector that detects a rotation state of the motor based on positive/negative polarities of counter-electromotive voltages of other phases with respect to the comparison reference voltage at the time of an occurrence of a zero cross between the counter-electromotive voltage of any one phase and the comparison reference voltage,
wherein the number of the phase of the motor is three, and
wherein the rotation state detector detects that the motor is in forward rotation at a predetermined speed or higher in a case where, when a zero cross between the rise of the counter-electromotive voltage of any one phase and the comparison reference voltage occurs, the counter-electromotive voltage of another phase leading the phase is positive with respect to the comparison reference voltage, and the counter-electromotive voltage of another phase retarding the phase is negative with respect to the comparison reference voltage.

2. The motor drive controller according to claim 1,
wherein the comparison reference voltage generator sets the comparison reference voltage based on an amplitude of the counter-electromotive voltage generated in each phase when the motor rotates at a predetermined speed.

3. A method for detecting rotation state of a three-phase motor, the method comprising:
generating a predetermined constant voltage as a comparison reference voltage;
comparing the comparison reference voltage with a counter-electromotive voltage of each phase of the motor;
detecting a rotation state of the motor based on positive/negative polarities of the counter-electromotive voltages of the other phases with respect to the comparison reference voltage at the time of an occurrence of a zero cross between the counter-electromotive voltage of any one phase and the comparison reference voltage; and
detecting that the motor is in forward rotation at a predetermined speed or higher in a case where, when a zero cross between the rise of the counter-electromotive voltage of any one phase and the comparison reference voltage occurs, the counter-electromotive voltage of another phase leading the phase is positive with respect to the comparison reference voltage, and the counter-electromotive voltage of another phase retarding the phase is negative with respect to the comparison reference voltage.

4. A method for detecting rotation state of a three-phase motor, the method comprising:
generating a predetermined constant voltage as a comparison reference voltage;
comparing the comparison reference voltage with a counter-electromotive voltage of each phase of the motor;
detecting a rotation state of the motor based on positive/negative polarities of the counter-electromotive voltages of the other phases with respect to the comparison reference voltage at the time of an occurrence of a zero cross between the counter-electromotive voltage of any one phase and the comparison reference voltage; and
detecting that a rotation speed of the motor is less than a predetermined speed in a case where, when a zero cross between the rise of the counter-electromotive voltage of any one phase and the comparison reference voltage occurs, both the counter-electromotive voltage of another phase leading the phase and the counter-electromotive voltage of another phase retarding the phase have a same sign with respect to the comparison reference voltage.

5. A motor drive controller for controlling a motor having multiple phases, the motor drive controller comprising:
a comparison reference voltage generator that generates a predetermined constant voltage as a comparison reference voltage;
a counter-electromotive voltage comparator that compares the comparison reference voltage with a counter-electromotive voltage of each phase of the motor; and
a rotation state detector that detects a rotation state of the motor based on positive/negative polarities of counter-electromotive voltages of other phases with respect to the comparison reference voltage at the time of an occurrence of a zero cross between the counter-electromotive voltage of any one phase and the comparison reference voltage,
wherein the number of the phase of the motor is three, and
wherein the rotation state detector detects that a rotation speed of the motor is less than a predetermined speed in a case where, when a zero cross between the rise of the counter-electromotive voltage of any one phase and the comparison reference voltage occurs, both the counter-electromotive voltage of another phase leading the phase and the counter-electromotive voltage of another phase retarding the phase have a same sign with respect to the comparison reference voltage.

6. The motor drive controller according to claim 5,
wherein the comparison reference voltage generator sets the comparison reference voltage based on an amplitude of the counter-electromotive voltage generated in each phase when the motor rotates at a predetermined speed.

* * * * *